United States Patent
Chiang et al.

[11] Patent Number: 6,056,796
[45] Date of Patent: May 2, 2000

[54] RIGID POROUS FILTER

[75] Inventors: Ta-Kuan Chiang; Douglas L. Straub; Richard A. Dennis, all of Morgantown, W. Va.

[73] Assignee: The United States of America as represented by the United States Department of Energy, Washington, D.C.

[21] Appl. No.: 09/020,814

[22] Filed: Feb. 9, 1998

[51] Int. Cl.[7] .................................................. B01D 46/24
[52] U.S. Cl. ................................ 55/302; 55/482; 55/484; 55/523
[58] Field of Search ............................ 55/302, 523, 482, 55/484, 485; 95/286, 287, 280, 273

[56]  References Cited

U.S. PATENT DOCUMENTS

| | | | |
|---|---|---|---|
| 4,343,631 | 8/1982 | Ciliberti | 55/523 |
| 4,576,799 | 3/1986 | Worner et al. | 55/484 |
| 4,812,149 | 3/1989 | Griffen et al. | 55/280 |
| 4,948,398 | 8/1990 | Thomaides et al. | 95/286 |
| 5,009,857 | 4/1991 | Haerle | 55/523 |
| 5,037,461 | 8/1991 | Zievers et al. | 55/523 |
| 5,106,395 | 4/1992 | Weber et al. | 95/280 |
| 5,108,601 | 4/1992 | Goldsmith | 210/247 |
| 5,114,581 | 5/1992 | Goldsmith et al. | 210/650 |
| 5,171,341 | 12/1992 | Merry | 55/523 |
| 5,252,206 | 10/1993 | Gonzalez | 55/523 |
| 5,254,144 | 10/1993 | Provol | 95/280 |
| 5,328,492 | 7/1994 | Zievers et al. | 55/523 |
| 5,433,771 | 7/1995 | Bachovchin et al. | 95/280 |
| 5,458,665 | 10/1995 | Martin et al. | 95/280 |
| 5,752,999 | 5/1998 | Newby et al. | 55/523 |
| 5,769,915 | 6/1998 | Dehn et al. | 55/523 |
| 5,833,725 | 11/1998 | Dehn et al. | 55/523 |
| 5,863,311 | 1/1999 | Nagai et al. | 55/484 |

OTHER PUBLICATIONS

Bossart, S.J., Test Programs of Large–Scale Particle Filters for Use in Advanced Coal–Fueled Power Generation Systems, 9th Particulate Control Symposium, Oct. 15–18, 1991, Williamsburg, VA.

McDaniel, Heather M., Staubly, Ronald K., & Venkataraman, Venkat K., Proceedings of the Coal Fired Power Systems 94—Advances in IGCC and PFBC Review Meeting, vol. I, Jun. 1994, Morgantown, WV.

MdDaniel, Heather M., Staubyl, Ronald K., & Venkataraman, Venkat K., procedings of the Coal–Fired Power Systems 94—Advances in IGCC and PFBC Review Meeting, vol. II, Jun. 1994, Morgantown, VW.

*Primary Examiner*—Duane S. Smith
*Attorney, Agent, or Firm*—Lisa M. Soltis; Mark P. Dvorscak; William R. Moser

[57] ABSTRACT

The present invention involves a porous rigid filter including a plurality of concentric filtration elements having internal flow passages and forming external flow passages there between. The present invention also involves a pressure vessel containing the filter for the removal of particulates from high pressure particulate containing gases, and further involves a method for using the filter to remove such particulates. The present filter has the advantage of requiring fewer filter elements due to the high surface area-to-volume ratio provided by the filter, requires a reduced pressure vessel size, and exhibits enhanced mechanical design properties, improved cleaning properties, configuration options, modularity and ease of fabrication.

20 Claims, 7 Drawing Sheets

RIGID POROUS FILTER

ORIGIN OF THE INVENTION

The United States Government has rights in this invention pursuant to the employer-employee relationship of the U.S. Department of Energy and the inventors.

BACKGROUND OF THE INVENTION

1. Field of the Invention

The present invention relates to filtration devices, vessels and related methods, and more particularly relates to rigid porous filtration devices, vessels and related methods.

2. Description of Related Art

Various filtration systems exist for removing particulates from liquid and gaseous mediums. For example, porous rigid filtration systems, such as ceramic candle filter systems, have been previously developed for use in particulate removal from hot high pressure gases. A filtration system previously disclosed is set out in Backovchin et al. U.S. Pat. No. 5,433,771 issued Jul. 18, 1995, entitled "Hot Gas Filtration System Fail-Safe and Thermal Regeneration Device," which is incorporated herein by reference.

Many processes exist wherein a hot gaseous medium is produced which contains particulate material that must be separated from the gaseous medium, either to prevent pollution or to remove hazardous material or to protect downstream equipment. High temperature filtration of particulate has become an important component in many emerging technologies. For example, advanced coal conversion technologies, such as fluid bed gasification and combustion, are dependent upon the successful removal of particulates at temperatures in the range of about 500° to 1100° C. Other applications which benefit from high temperature filtration range from gas cleaning for biomass gasification to power generation from the incineration of municipal solid wastes. These applications require the removal of particulates from gas streams at high temperature so that process equipment, such as rotating machinery and heat exchange surfaces, remain functional and efficient throughout the use of such equipment.

Rigid ceramic filters are currently being developed and used for separating entrained particles, such as flyash or char, from the hot gases produced in energy generating systems and industrial processes. In these hot gas filtration systems, the ceramic filter often serves as the only filter device for trapping undesirable particles contained in the flow of hot gases which pass through the filtration system.

One type of ceramic filter element, the cross flow filter, is described in Ciliberti U.S. Pat. No. 4,343,631, which is incorporated herein by reference. The cross flow filter comprises several layers of porous ceramic membranes joined together in such a manner as to increase filter area per unit volume. Particle laden gases pass into dirty side channels of the filter and then through the filter membranes where the particles are deposited as cake on the surface of the membranes within the dirty side channels. The cleaned gases then pass into and through the clean side channels of the filter and subsequently exit the filter. Generally within the filter system, a plurality of such filter elements are connected to a single plenum pipe through which the filtered clean gas passes after flowing through the filter elements.

Typically, the filter elements are periodically cleaned by providing a pulse of high pressure gas which is pumped through a pulse cleaning pipe in flow communication with the plenum pipe. The pulse of high pressure gas causes reverse flow through the filter elements which dislodges the cake of particles trapped by the filter elements such that at least some of the cake falls out of the filter elements and is collected and disposed of through a discharge point in a known manner. The high pressure gas used to clean the filters is usually cold due to the known difficulties of pulsing high temperature gas with existing valves.

In addition to the cross-flow filter systems, another popular type of rigid ceramic filter (as briefly mentioned above) is referred to as a candle filter and comprises a hollow cylinder which is closed at one end and flanged at the other for attachment to a tubesheet or blowback plenum, into which cleaned gas passes during the filtration cycle. Particle laden gas passes through the filter elements such that the particles are trapped on the filter surface and the clean gas flows into the hollow center of the candle and out through the open flanged end. In such candle filtration systems, a plurality of candle filters are connected to a plenum pipe such that the clean gas from the plurality of candles flows into the plenum pipe. A pulse of cold gas is periodically blown into the candles for dislodging at least some of the cake from the filter elements.

Candle-type ceramic barrier filters of the general type discussed above are disclosed in U.S. Pat. No. 4,973,458-Newby et al.; U.S. Pat. No. 4,812,149-Griffin et al.; U.S. Pat. No. 4,764,190-Israelson et al.; U.S. Pat. No. 4,735,635-Israelson et al.; and U.S. Pat. No. 4,539,025-Ciliberti et al., each of which is incorporated herein by reference.

While the filtration systems have been generally useful, problems have been recognized in the use of such filtration systems. Since these types of filter devices comprise porous ceramic materials which are subjected to high temperature corrosive environments and to fluctuations in temperature, one or more of the individual filter elements in the system can break. Moreover, since the pulse of high pressure cleaning gas is cold, the elements are subjected to severe changes in temperature such that the filter elements are further prone to breaking. Where one or more of the filter elements in the system breaks, an open path through the filter vessel is available such that the flow of gas through the hole is limited only by the relatively small flow resistance of the orifice left by the missing pieces of ceramic material. Thus, dirty particles remain in the gas after passing through the filtration system, resulting in a substantial decrease in effectiveness of the overall system, as well as, possible adverse effects on the environment and downstream equipment.

For many years, the U.S. Department of Energy has fostered the commercialization of advanced coal-conversion power systems as an efficient means of utilizing the nation's abundant coal supply. High temperature filtration devices are an integral link in the commercialization of these advanced power systems. As set out above, among all the high temperature filtration devices, ceramic candle filter systems are the conventional means of removing fine particulates from high temperature gas streams. Problems with these conventional candle filter devices typically include:

a) A large number of filter elements are needed for a commercial scale system, for example, 384 candles have been used for a 10-MWe pressurized fluidized bed combustion system, and a 100-MWe scale may require as many as 3840 filter elements;

b) The filter vessel required to accommodate thousands of candle elements would necessarily be very large, and would be a factor of the length of the candle filter element, for example, a 10-MWe pressurized fluidized bed combustion system has adopted a three-tier arrangement of filters with most of the space taken by nonfiltering components, such as plenums, ash sheds, and plenum support conduits; and c) Due to the long slender design and the brittle nature of ceramic candle filter elements, they are generally not resilient to mechanical loads that may induce excessive tensile stresses in the ceramic material. In addition to the high aspect ratio for candle filter elements, the ceramic elements are usually mounted such that the body of the filter is preloaded in tension rather than compression.

Consequently, there is a need and a desire for a porous rigid filtration system which solves one or more of the above problems.

SUMMARY OF INVENTION

The present invention involves a porous rigid filter comprising a plurality of concentric filtration elements having internal passages therein and forming external passages therebetween. The present invention also involves a pressure vessel containing the filter for the removal of particulates from high pressure (particulate containing) gases, and further involves a method using the filter for removing such particulate. The present filter has the advantage of requiring fewer filter elements due to the high surface area to volume ratio provided by the filter, requires a reduced pressure vessel size, and exhibits enhanced mechanical design properties, improved cleaning properties, configuration options, modularity and ease of fabrication.

DETAILED DESCRIPTION OF THE INVENTION

Figure 10:
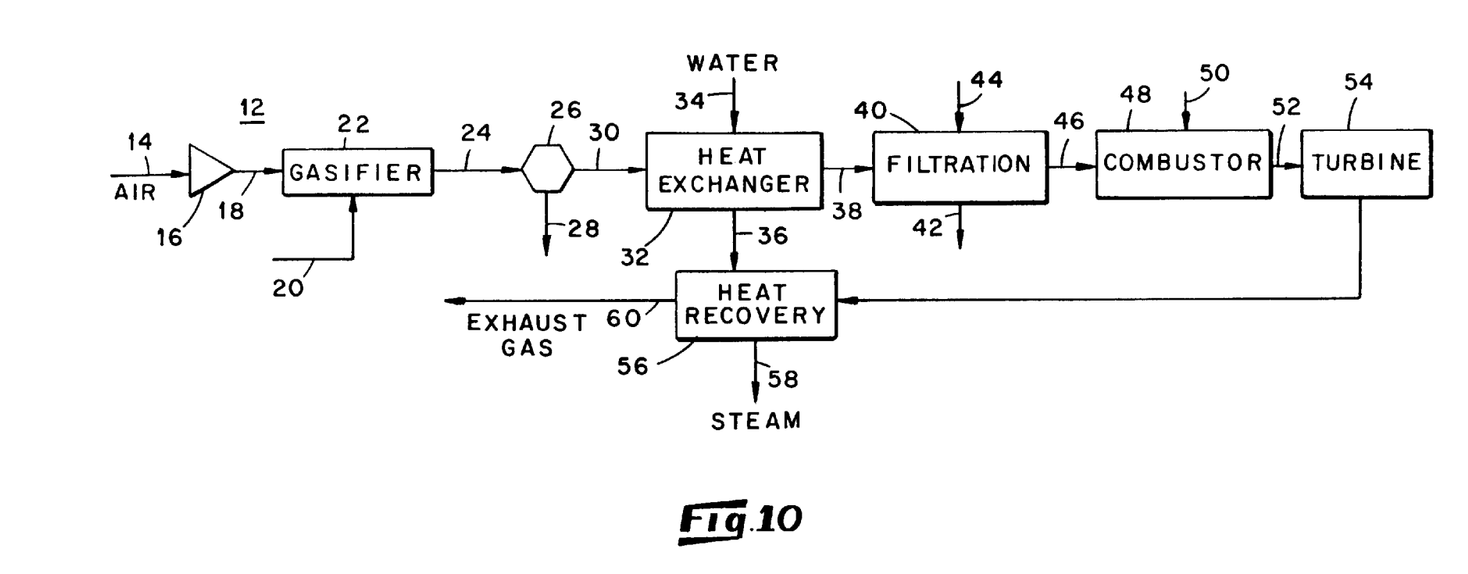
FIG. 10 is a schematic of a coal gasification power plant using a filtration vessel of the present invention.

As best shown in FIG. 10, a schematic diagram of a coal gasification power plant (process) (12) is provided wherein power is generated by the following stages (steps): (a) an atmospheric air stream (14) enters a compressor (16) wherein the air is compressed and exits the compressor (16) as a compressed air stream (18); (b) the compressed air (18) and a coal stream (20) are fed to a gasifier (22) wherein fuel gas is produced and exits the gasifier (22) as a high temperature compressed fuel gas stream (24) having a temperature of for example above 1500 degrees C. and a pressure above 350 psia; (c) optionally, the fuel gas stream (24) is then fed to a cyclone separator (26) for the removal of a portion of the particulates (fly ash, slag, etc.) from the fuel gas as a solids stream (28) and the remaining fuel gas then exits the separator (26) as a partially cleaned fuel gas stream (30); (d) optionally, the partially cleaned fuel gas stream (30) is passed through a heat exchanger (32) wherein heat is exchanged between the partially cleaned fuel gas and a water feed stream (34) (liquid or steam) which enters the heat exchanger (32) and exits the heat exchanger (32) as a heated water (steam) stream (36) and the fuel gas leaves the exchanger as a reduced temperature fuel gas stream (38); (e) the reduced temperature fuel gas stream (38) (for example having a temperature of less than 1000 degrees C.) is then filtered in a filtration vessel (40) of the present invention wherein particulates are removed and eventually discharged as a particulate waste stream (42) (by utilization of clean air pulse stream (44)) and a clean fuel gas stream (46) exits the filtration vessel (40); (f) the clean fuel gas is then fed to a combustor (48) wherein it is combusted (optionally in combination with another fuel such as oil or natural gas from an additional fuel stream (50)) and exits the combustor (48) as a combusted gas stream (52); (g) the combusted gas stream (52) is then fed to a turbine (54) wherein it is expanded and flows through a heat recovery unit (56) for transfer of heat to the water (steam) from stream (36) to produce a recovery stream (58) and an exhaust gas (60). The plant (12) thus involves a process having the steps of (a) compressing air to produce compressed air, (b) gasifying coal in the presence of the compressed air to produce a high pressure high temperature particulate laden fuel gas stream, (c) cyclone separating a portion of the particulates from the gas stream, (d) transferring heat from the gas stream to a water stream thereby producing a reduced temperature gas stream and a heated water (steam stream), (e) filtering the gas stream with a filtration vessel comprising filters of the present invention to produce a clean fuel gas, (f) combusting the clean gas, (g) expanding the combusted gas in a turbine, (h) recovering heat from the expanded gas and (i) exhausting the expanded gas.

The vessel (40) houses concentric multifold filters (filtration device) (62) of the present invention (also referred to as a concentric annular rigid filter (CAR filter)). The present filter (62), due to its compact design and high surface area, solves the conventional candle filter problems mentioned above. The filter (62) allows more surface area to be packaged into a given volume. The number of filters can be reduced, for example, by a factor of eight compared to conventional filter designs by using the filter (62) of the present invention.

The present invention also permits the use of a significantly smaller filter vessel (40) and therefore lower capital costs can be realized with the present filter (62). For a 10-MWe scale vessel, a single tier of 49 CAR filters could be housed in a 10-feet diameter vessel that is less than 10-feet long. Note that this vessel has a filtering capacity equivalent to three-tiers of candle filters (384 total elements) housed in a 10-foot diameter vessel roughly 44-feet long.

The present filter (62) preferably has a low aspect ratio design (i.e., the length-to-diameter ratio is small) and can be preloaded in compression, making the filter more durable to mechanical loads and stresses. In addition, sintered metal materials and toughened ceramics can be used to reduce catastrophic brittle failures.

Figure 9:
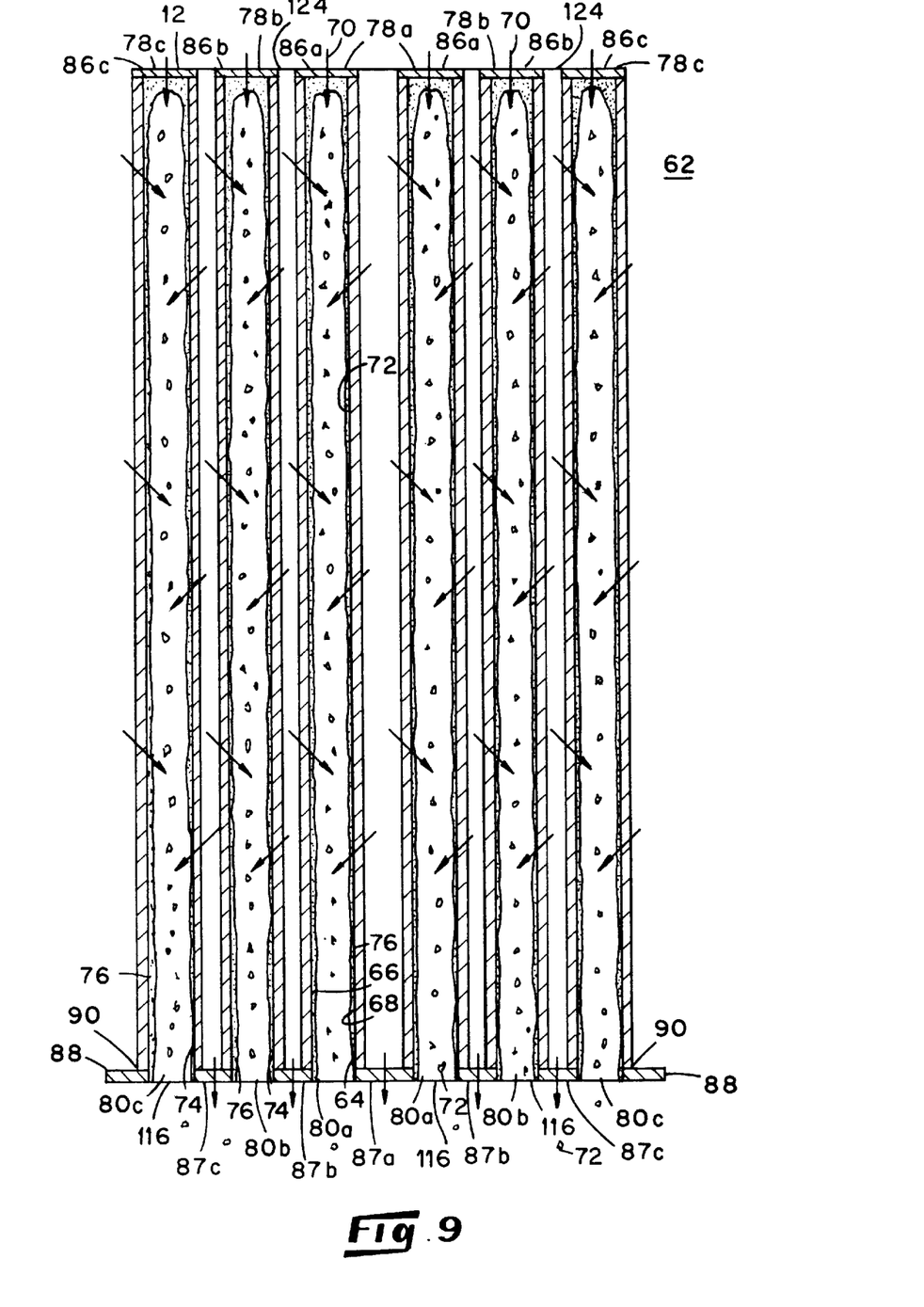
FIG. 9 is a vertical cross-section of a filter according to the present invention during a reverse gas pulse to remove caked particulate.

The filter (62) can optionally incorporate the use of a permeable membrane coating (64) (described below) on all filter faces (66, 68) (and ends if permeable) that would allow gas flow (70) (from pulse stream (44)) during the reverse pulse cleaning event to shear dust (particulate) cake (72) from the filter walls (74, 76), as shown in FIG. 9.

The filter (62) of the present invention is not limited to a cylindrical form, and may use other concentric designs including hexagonal, rectangular, and conical. Also, due to its compact, low aspect ratio design, the present filter (62) can be more modular than conventional filters. Therefore, the CAR filter (62) is expected to be easier to use and maintain in comparison to conventional ceramic filters.

Manufacturing of the filter (62) may use current proven ceramic filter fabrication techniques. Suitable ceramic barrier filter materials are disclosed in Bachovchin et al, U.S. Pat. No. 5,433,771; Newby et al, U.S. Pat. No. 4,973,458; Griffin et al, U.S. Pat. No. 4,812,149; Israelson et al, U.S. Pat. No. 4,764,190; Israelson et al, U.S. Pat. No. 4,735,635; and Ciliberti et al, U.S. Pat. No. 4,539,025, all of which are incorporated herein by reference. The CAR filter (62) is suitable for removing fine particulates from high temperature, high pressure gas streams efficiently and economically.

The CAR filter (62) is a concentric arrangement of porous filter elements (78a, b, c) in which gas flows through annular regions (80) located within the elements (78) and between outer walls (76) and inner walls (74) thereof. The porous walls at their faces (66, 68) function as barriers that separate the feed-stream (38) into filtrate (cake (72) and particulate waste stream (42)) and clean product gas (82) (which becomes clean fuel gas stream (46)). Depending on the filter material chosen, fabrication techniques such as injection molding, weaving and vapor deposition could be used to produce an integral filter.

As best shown in FIGS. 1, 2, 4 and 9, a CAR filter (62) has three concentric elements (78a, 78b, 78c) each having a pair of cylindrical walls ((74a, 76a), (74b, 76b), (74c, 76c)). Annular spacing (spaces (84a, 84b, 84c) (the centermost space (84a) is actually located in the center of central annular element (78a)) between the elements (78) can be varied to minimize the space requirements for cleaning passageways (spaces) (84a, 84b, 84c) and control the inlet velocities into pathways (regions, channels) (80a, 80b, 80c) within the elements (78a, 78b, 78c) located between the walls (74, 76) of each element (78).

Figure 1:
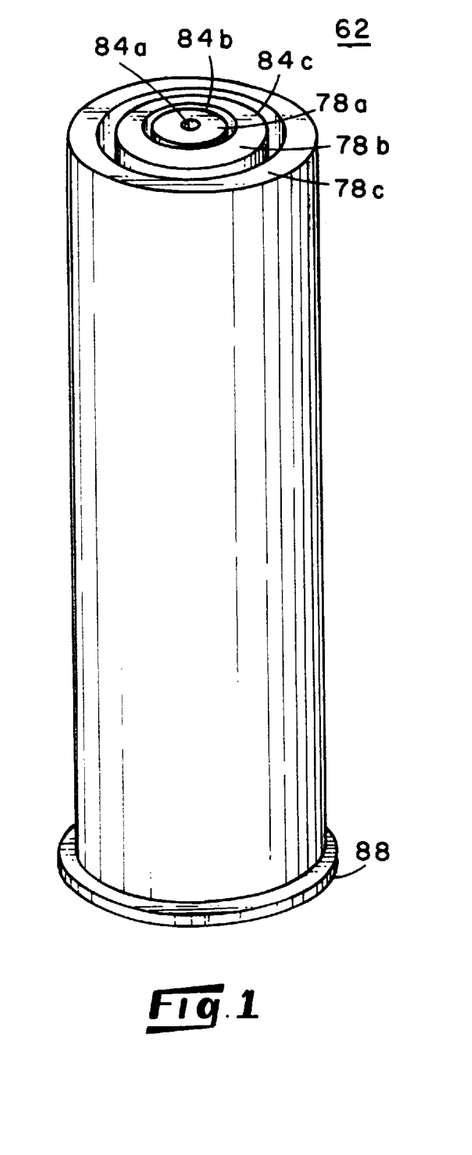
FIG. 1 is a perspective view of one filter of the present invention.
Figure 2:
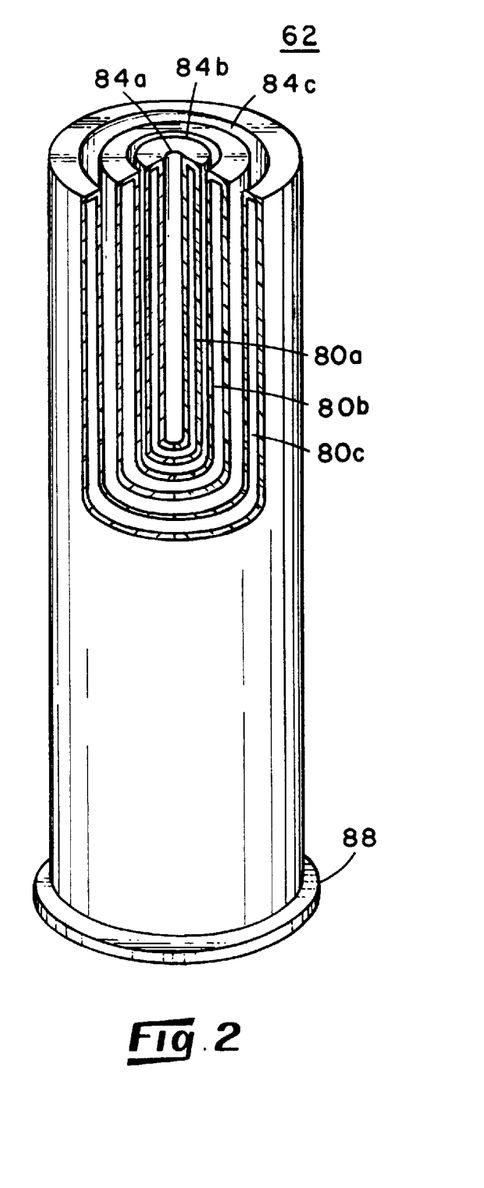
FIG. 2 is a perspective view of the filter of FIG. 1 with a quadrant of the filter cut away for viewing the interior of the filter.
Figure 7:
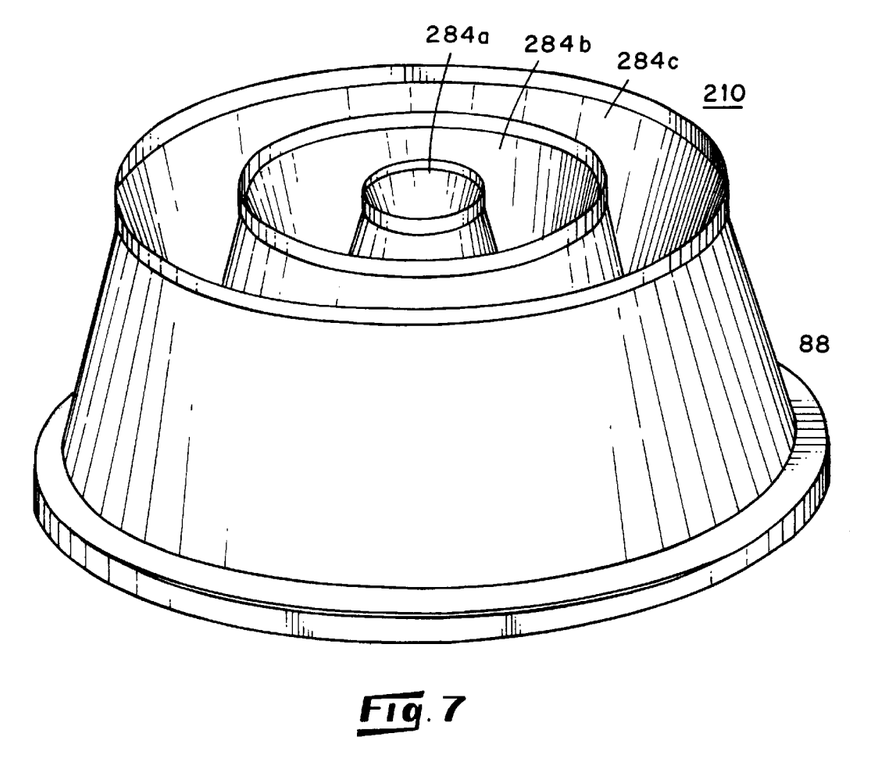
FIG. 7 is an alternative filter configuration wherein the elements have tapering passages.
Figure 8:
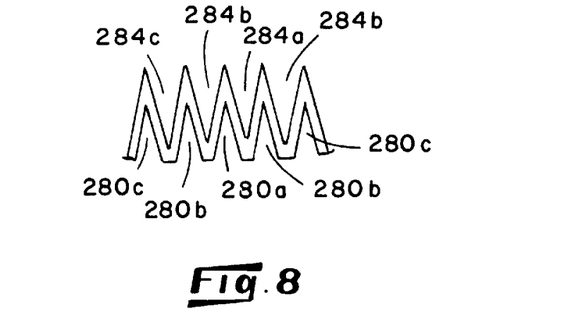
FIG. 8 is a vertical cross-section of the filter of FIG. 7.

The CAR filter (62) of the present invention is not limited to the cylindrical array configurations shown in FIGS. 1 and 2. Other concentric arrays (i.e., hexagonal, triangular, rectangular, pentagonal, etc.) (not shown) could also be made for special reasons. For example, FIG. 7 shows a filter (210) having a concentric conical array as an alternative embodiment of the present invention. Note that for the concentric conical array filter (210) of FIG. 7, both the filtration regions (280a, b, c) and the cleaning channels (284a, b, c) are larger at their respective (downstream) inlets than at the respective upstream ends. This will likely facilitate dust cake removal and distribution of the back-pulse cleaning gas. The conical configuration of FIG. 7 is best suited for sintered metals in which circumferential weld seams are used instead of porous end caps.

The filters (62, 210) are suitable for particulate and emission control in coal-conversion power systems, such as Integrated Gasification Combined Cycle (IGCC) systems, Pressurized Fluidized Bed Combustion (PFBC) systems, Pulverized Coal (PC) boilers, and Waste Incinerators.

Figure 4:
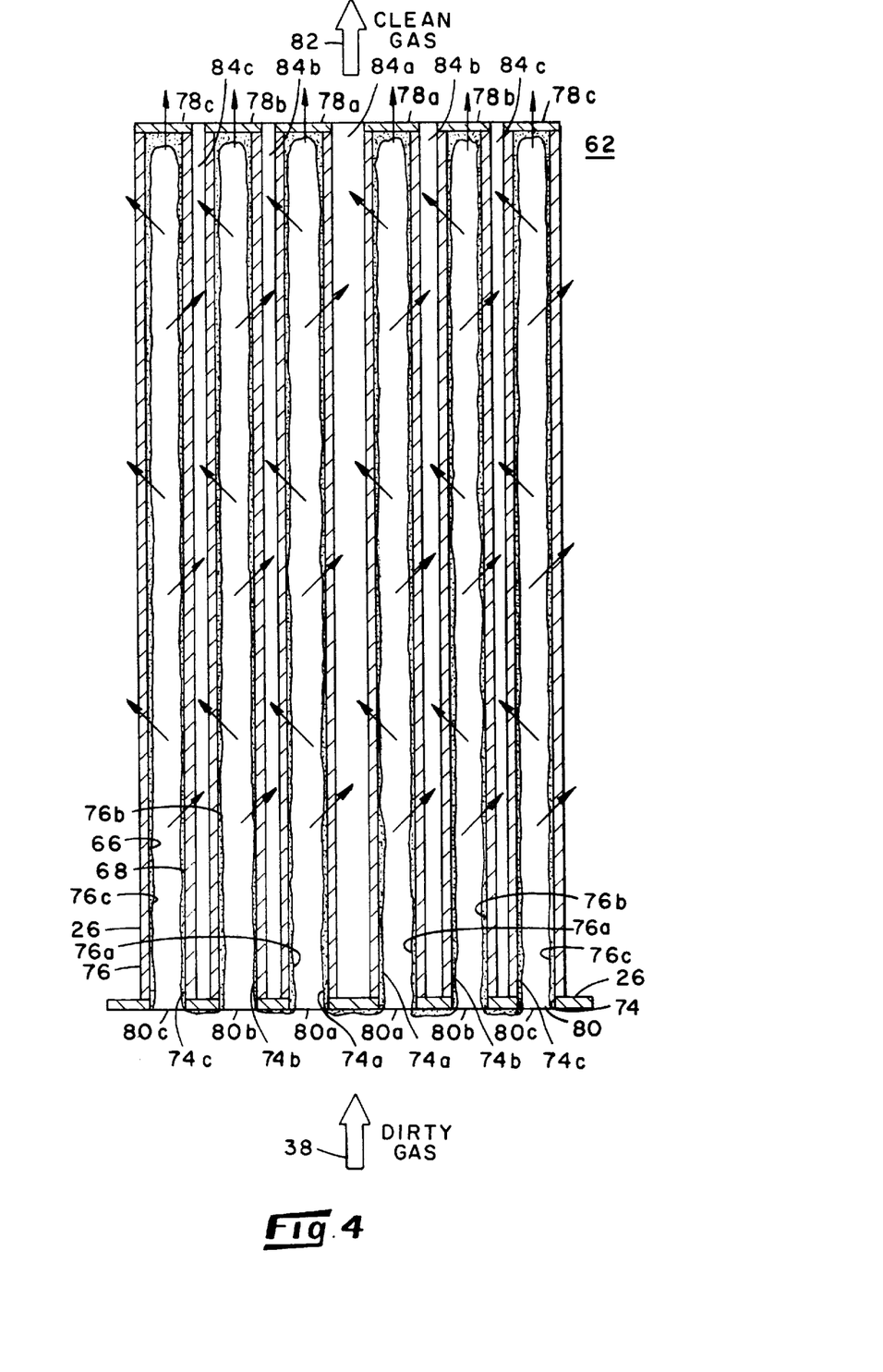
FIG. 4 is a vertical cross-sectional view of the filter of FIG. 1.

As best shown in FIGS. 1 and 2, the porous filter device (62) has a plurality of concentric filtration elements (78a, b, c). Each element (78) has an internal flow pathway (channel) (80a, b, c). The elements (78) form external passageways (84a, b, c) between adjacent elements (78). As shown in FIG. 4, each element (78) comprises an inner wall (74) and an outer wall (76). The filter device (62) has a first inner porous rigid filtration element (78a) having an inner wall (74a) and a outer wall (76a) wherein the outer wall (76a) is spaced apart from the inner wall (74a) and defines an internal pathway (80a) therebetween; and the filter device (62) has an outer porous rigid filtration element (78c) having an inner wall (74c) and an outer wall (76c) wherein the outer wall (76c) is spaced apart from the inner wall (74c) to form an inner flow pathway (80c); wherein the outer element (78c) is concentric around (about) the inner element (78a). Preferably the device (62) has multiple or plurality of elements (78) to increase the effective surface area to volume ratio for the filter device (62). As shown in FIG. 1, the device may have an intermediate element (78b) positioned (located) between the inner element (78a) and the outer element (78c) in concentric arrangement therewith. Adjacent elements are spaced apart to define reverse pulse passageways (84) therebetween.

As shown in FIG. 9, the elements (78) may be formed by positioning two annular filtration rings (cylinders, walls) (76, 74) having differing dimensions (diameters) in adjacent concentric arrangement and connecting one end of the rings (74, 76) with a circular (annular) ring cap (86a, b, c), and adjacent elements are interconnected by a circular (annular) ring base (87b, c) and the bottom of the inner element (78a) has a circular (closed) base (87a) extending across the bottom of the inner wall thereof. Preferably the caps (86) and the ring bases (87) are porous for the flow of gases therethrough. Alternatively, walls in the shape of conical sections as shown in FIG. 7 as the alternative embodiment of the filter (210) may be used with ring caps or without ring caps by directly connecting (welding) the walls at respective ends thereof.

Figure 3:
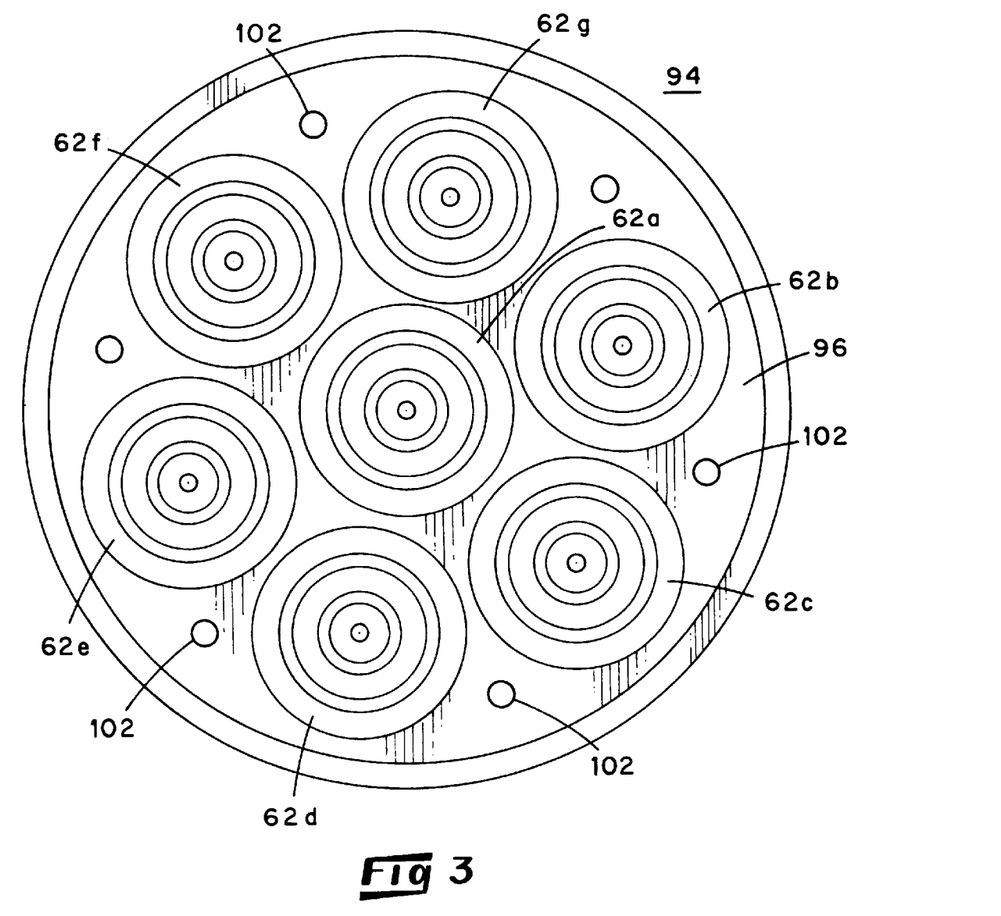
FIG. 3 is a top plan view of a cluster of filters of the present invention.
Figure 5:
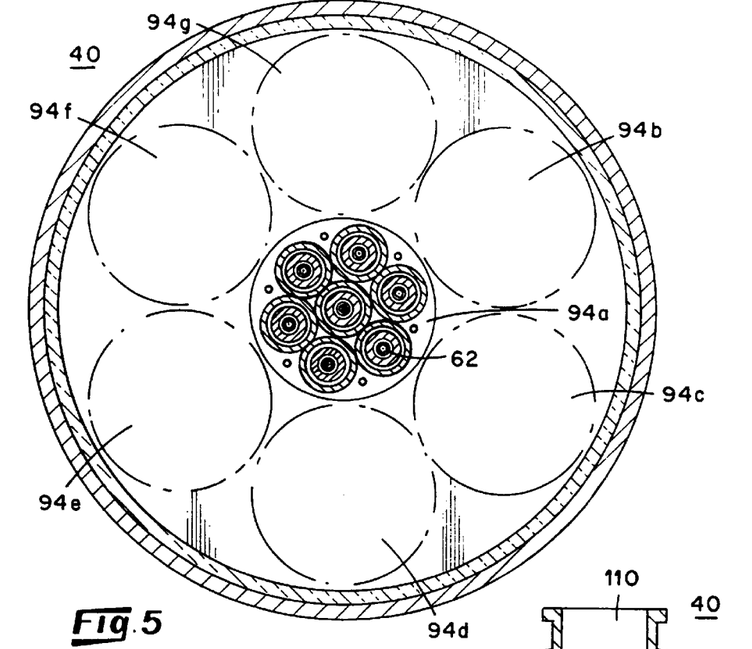
FIG. 5 is a horizontal cross-sectional top view of a vessel having a plurality of clusters of filters.
Figure 6:
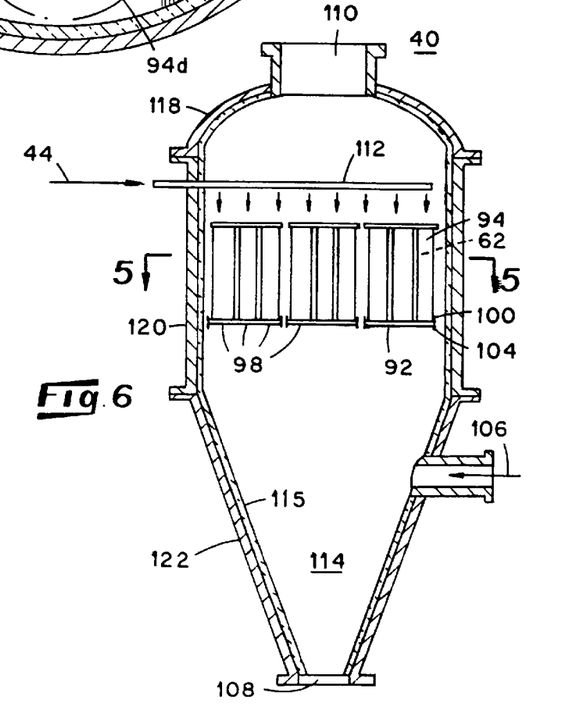
FIG. 6 is a vertical cross-sectional view of a vessel having a plurality of clusters of filters.

As shown in FIGS. 6 and 9, an outer flange (88) is affixed to the outer bottom circumference (90) of the outermost element (78c) to permit connection of the devices (62) to an internal structural support member (92) of a pressure vessel (40). As shown in FIG. 3, the filters (62) may be arranged in a cluster (94) within the vessel (40). A suitable cluster (94) has a plurality of filters (62), for example seven filters (62) arranged with one upright filter (62a) surrounded by six upright filters (62b, 62c, 62d, 62e, 62f, 62g). The cluster (94) has a circular tube sheet (96) for supporting the weight of the filters (62) of the cluster (94). As shown in FIGS. 5 and 6, the clusters (94) may be arranged to maximize the number of clusters (94) on a given internal structural support member (92) within a cylindrical vessel (40), for example one upright cluster (94a) surrounded by six upright clusters (94b, 94c, 94d, 94e, 94f, 94g). The tube sheet (96) has a series of holes (98) underneath the elements of each filter (62) for permitting fluid flow through the tube sheet (96) to and from the filter (62). Each hole (98) is smaller in diameter than the outer diameter of the respective flange (88) to prevent the filter (62) from falling through the hole (98). The tube sheet (96) preferably is attached to the internal structural support member (92), and may suitably be attached to the internal structural support member (92) by placing bolts (100) into bolt holes (102) through the support member (92) and securing the clusters (94) to the support member (92) by tightening of the bolts (100) with a nut (104).

As shown in FIG. 6, the vessel (40) preferably has a dirty gas inlet (106) for the flow of particulate containing gas (stream (38)) into the vessel (40), a particulate discharge outlet (108) and a clean gas outlet (110). The vessel (40) also contains a back pulse tube (manifold) (112) for providing a back flush pulse of clean gas (clean gas stream (44)) to dislodge accumulated particulates (cake (72)) from the filter (62) and into the bottom of an ash hopper (114) in the bottom of the vessel (40) and out to (through) the ash discharge outlet (108). The vessel (40) preferably has an inner insulative lining (115). The vessel (40) preferably has a top dome section (118) which has the outlet (110), a cylindrical main body section (120) beneath the top section (118), and a bottom funnel section (122) tapering downwardly from the bottom of the main body section (120). The bottom portion of the funnel section (122) serves as the ash hopper (114). As shown in FIG. 9, the gas stream (38) flows into the filter (62) through annular (ring shaped) mouths (116) of the channels (80). The mouths (116) are formed by the spaced apart walls (74, 76). In the alternative embodiment of FIG. 7, the walls (74, 76) taper toward each other to form the mouth (116) to the other end of the filter (62). The pulse air enters through ring shaped entry ports (124) of FIG. 9 formed by the space between the top of the elements.

The process involves a particulate filtration process comprising providing a porous rigid filter (62) comprising a plurality of concentric filtration elements (78a, 78b, 78c), each element having an internal flow pathway (80a, 80b, 80c), said elements forming external clean air pulse passages (84a, 84b, 84c) between adjacent elements (78). The internal filtration passages (80) are preferably wider than the external clean air pulse passages (84).

A suitable six-cylindrical wall (three element) filter (62) would have a filter outside diameter (O.D.) of 10.4 inches, an internal filtration passage (80) width of 1 inch, an external clean air pulse passage (84b, 84c) width of 0.35 inches, a central clean air pulse passage diameter (84a) of 0.71 inches, filter wall thicknesses of 0.18 inches, filter element length of 34 inches, effective filter length of 2.70 feet, and a filter element O.D. (including hold-down flange (88)) of 11.5 inches. The filter would be suitable for a flow rate of 144 actual cubic feet per minute (the equivalent of eight commercial candle filters), a face velocity of 6 feet-per-minute, and a gas inlet velocity of 4.4 feet-per-second. A suitable sevenfilter cluster (94) would involve seven CAR filters (62) grouped together into a diameter of approximately 3-feet. The nominal flow capacity of this 7-filter cluster (94) would be 1000 actual cubic feet-per-minute for filters (62) having the above specified dimensions.

A suitable seven-cluster (94) arrangement grouped together in a filter vessel (40) would maintain a gas throughput of approximately 7000 actual cubic feet-per-minute. This throughput is equivalent to the throughput of a 10-MWe pressurized fluidized bed combustion power generation facility utilizing nine conventional clusters and three tiers of candle filter elements.

It should be noted that the diameter of a suitable seven-cluster (94) vessel (40), of the present invention, would be 10-feet 8-inches for a 10 Mwe pressurized fluidized bed combustion power generation facility. Note also that only 49 filter elements are needed with the present system for this 10 Mwe facility, not the 384 conventional candles required in a conventional 10 MWe combustion power generation facility. The reduction in the number of filter elements and the length of the filter vessel is nearly a factor of 8.

Itemized below are some of the unique features of the CAR filter technology of the present invention: a) the gas channels for filtration and cleaning are oriented concentrically; b) the primary filtration surfaces are also oriented concentrically; c) the end-plugs (ring caps (86)) for the gas flow channels can be preferentially permeable, or conventionally impermeable; d) among other concentric geometric arrangements, concentric conical passageways can be realized to improve various filter performance characteristics; e) the compact design reduces the number of filter elements and the size of the vessel required (for example by a factor of eight over conventional candle filter systems); f) variable annular channel sizes allow the cleaning passage volumes to be substantially less than the filtration channel volumes thereby improving the compactness of the filter; g) the low length-to-diameter ratio provide improved mechanical durability and maintain a reasonable inlet flow velocity; h) the modular design facilitates maintenance and design flexibility; and i) the filter is suited for mounting in compression.

Use of the CAR filter is not limited to high temperature, high pressure particulate control. It is equally applicable to medium and low temperature applications such as pulverized coal boilers and waste incinerators in the temperature range of 300 to 700° F. It would be technically and economically advantageous to place this filter in systems for simultaneous particulate control and NOX selective catalytic reduction (SCR). Other applications of simultaneous control of particulate and catalytic reaction are equally beneficial.

If a membrane is used on the faces (or other surfaces) of the filters, the membrane may be in the form of a coating, and may be of a variety of suitable membrane materials selected from polymeric and inorganic materials. Suitable polymeric materials may be selected from cellulose, cellulose acetates, cellulose nitrate, polyethylene, polypropylene, polyamides, polyesters, polycarbonates, polyvinylidene difluoride, polytetrafluoroethylene, polysulfones, polyethersulfones, polyacrylonitriles, and mixtures thereof. Inorganic materials which can be used include sintered metals and ceramic membranes. Ceramic membranes can include alumina, titania, silica, zirconia, cordierite, mullite, spinel, silicon carbide, silicon nitride, and mixtures thereof, bonded by thermal sintering or with a reactive inorganic binder. The membrane coating may have a mean pore size of from 0.1 micron to 5 microns, and the thinner the membrane coating the generally less the hydraulic resistance. Preferably the membrane has a thickness of less than 100 microns. Various known techniques are suitable for application of membrane coatings to ceramics.

What is claimed is:

1. A multi-walled rigid porous ceramic filter device having a gas inlet end and a gas outlet end, suitable for use for particulate filtration, said device comprising:

an inner filtration element having an inner porous ceramic tubular wall and an outer porous ceramic tubular wall spaced apart from said inner wall, wherein said space defined between said inner and outer walls is an internal flow passage having a closed end at the gas outlet end of said device;

an outer filtration element having an inner porous ceramic tubular wall and an outer porous ceramic tubular wall spaced apart from said inner wall of said outer filtration element, wherein said space defined between said inner and outer walls of said outer filtration element is an internal flow passage having a closed end at the gas outlet end of said device, said outer filtration element concentrically surrounding said inner filtration element;

an external flow passage defined by a space between said outer wall of said inner filtration element and said inner wall of said outer filtration element, said external flow passage having a closed end at the gas inlet end of said device; and means for generating desired pressure differentials between said internal and said external flow passages, wherein during filtration the pressure differential is sufficient to cause a gas to flow from said internal flow passage to said external flow passage to filter any particulate matter from the gas by passage through said porous ceramic tubular walls, and during regeneration the pressure differential is sufficient to cause a purge gas substantially free of particulate matter to flow from said external flow passage to said internal flow passage to evacuate any filtered particulate matter from said device.

2. The device of claim 1 wherein said device is comprised of a plurality of a plurality of concentric filtration elements, and wherein the inner wall of the innermost filtration element defines an external flow passage.

3. The device of claim 1, wherein said tubular walls of said inner and outer filtration elements are conically shaped.

4. The device of claim 1, wherein said tubular walls of said inner and outer filtration elements have circular, hexagonal, triangular, pentagonal or rectangular cross-sections.

5. A multi-walled rigid porous sintered metal filter device having a gas inlet end and a gas outlet end suitable for use for particulate filtration, said device comprising:

an inner filtration element having an inner porous sintered metal tubular wall and an outer porous sintered metal tubular wall spaced apart from said inner wall, wherein said space defined between said inner and outer walls is an internal flow passage having a closed end at the gas outlet end of said device;

an outer filtration element having an inner porous sintered metal tubular wall and an outer porous sintered metal tubular wall spaced apart from said inner wall of said outer filtration element, wherein said space defined between said inner and outer walls of said outer filtration element is an internal flow passage having a closed end at the gas outlet end of said device, said outer filtration element concentrically surrounding said inner filtration element;

an external flow passage defined by a space between said outer wall of said inner filtration element and said inner wall of said outer filtration element, said external flow passage having a closed end at the gas inlet end of said device; and means for generating a desired pressure differential between said internal and said external flow passages, wherein during filtration the pressure differential is sufficient to cause a gas to flow from said internal flow passage to said external flow passage to filter any particulate matter from the gas by passage through said porous sintered metal tubular walls, and during regeneration the pressure differential is sufficient to cause a purge gas substantially free of particulate matter to flow from said external flow passage to said internal flow passage to evacuate any filtered particulate matter from said device.

6. The device according to claim 5, further comprising a plurality of outer filtration elements having increasing outer diameters and concentrically surrounding said inner filtration element.

7. The device according to claim 5, wherein said pressure differential generating means is selected dimensions of said device and a selected gas inlet velocity.

8. The device according to claim 5, wherein said closed ends are porous.

9. The device according to claim 5, wherein the distance between said inner and outer walls that defines said internal flow passages is greater than the distance between said outer and inner walls that defines said external flow passages.

10. The device according to claim 5, wherein the distance between said inner and outer walls that defmes said internal flow passages is 25.4 mm and the distance between said outer and inner walls that defines said external flow passages is 8.89 mm.

11. The device according to claim 5, wherein the volume of the external flow passages is substantially less than the volume of said internal flow passages.

12. The device according to claim 1, wherein said pressure differential generating means is selected dimensions of said device and a selected gas inlet velocity.

13. The device according to claim 1, wherein a ceramic membrane is applied to said inner and outer porous ceramic tubular walls of said filtration elements.

14. The device according to claim 1, wherein said closed ends are comprised of porous ceramic material.

15. The device according to claim 1, wherein the distance between said inner and outer walls that defines said internal flow passages is greater than the distance between said outer and inner walls that defines said external flow passages.

16. The device according to claim 1, wherein the distance between said inner and outer walls that defines said internal flow passages is 25.4 mm and the distance between said outer and inner walls that defines said external flow passages is 8.89 mm.

17. The device according to claim 1, wherein the volume of the external flow passages is substantially less than the volume of said internal flow passages.

18. A multi-walled rigid porous filter device having a gas inlet end and a gas outlet end suitable for use for particulate filtration, said device comprising:

an inner filtration element having an inner porous tubular wall and an outer porous tubular wall spaced apart from said inner wall, wherein said space defined between said inner and outer walls has a first width and is an internal flow passage having a closed end at the gas outlet end of said device;

an outer filtration element having an inner porous tubular wall and an outer porous tubular wall spaced apart from said inner wall of said outer filtration element, wherein said space defined between said inner and outer walls of said outer filtration element has the first width and is an internal flow passage having a closed end at the gas outlet end of said device, said outer filtration element concentrically surrounding said inner filtration element;

an external flow passage defined by a space between said outer wall of said inner filtration element and said inner wall of said outer filtration element, said external flow passage having a second width less than the first width and a closed end at the gas inlet end of said device, such that the volume of said external flow passage is substantially less than the volume of said internal flow passages; and means for generating a desired pressure differential between said internal and said external flow passages, wherein during filtration the pressure differential is sufficient to cause a gas to flow from said internal flow passage to said external flow passage to filter any particulate matter from the gas by passage through said porous tubular walls, and during regeneration the pressure differential is sufficient to cause a purge gas substantially free of particulate matter to flow from said external flow passage to said internal flow passage to evacuate any filtered particulate matter from said device.

19. The device according to claim 18, wherein the first width is 25.4 mm and the second width is 8.89 mm.

20. The device according to claim 18, wherein the porous inner and outer walls are constructed from a material selected from the group consisting of ceramics or sintered metals.

* * * * *